US012531799B2

(12) United States Patent
Kishida et al.

(10) Patent No.: US 12,531,799 B2
(45) Date of Patent: Jan. 20, 2026

(54) TERMINAL APPARATUS, COMMUNICATION METHOD, AND COMMUNICATION PROGRAM

(71) Applicant: NTT, Inc., Tokyo (JP)

(72) Inventors: Akira Kishida, Musashino (JP); Yasuhiko Inoue, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 597 days.

(21) Appl. No.: 17/790,916

(22) PCT Filed: Jan. 10, 2020

(86) PCT No.: PCT/JP2020/000668
§ 371 (c)(1),
(2) Date: Jul. 5, 2022

(87) PCT Pub. No.: WO2021/140649
PCT Pub. Date: Jul. 15, 2021

(65) Prior Publication Data
US 2023/0034981 A1    Feb. 2, 2023

(51) Int. Cl.
*H04L 43/087* (2022.01)
*H04B 17/309* (2015.01)
*H04B 17/345* (2015.01)
*H04B 17/364* (2015.01)
*H04L 1/20* (2006.01)
*H04L 43/062* (2022.01)
*H04L 43/0852* (2022.01)
(Continued)

(52) U.S. Cl.
CPC .......... *H04L 43/087* (2013.01); *H04W 24/10* (2013.01)

(58) Field of Classification Search
CPC .............................. H04L 43/087; H04W 24/10
USPC ......................................................... 370/252
See application file for complete search history.

(56) References Cited

U.S. PATENT DOCUMENTS

2004/0258012 A1\*  12/2004  Ishii ..................... H04L 47/283
                                                                    342/450
2008/0005354 A1    1/2008  Kryskow, Jr. et al.
(Continued)

FOREIGN PATENT DOCUMENTS

| JP | 2012209780 | 10/2012 |
| JP | 5719470 | 3/2015 |
| JP | 2015139699 | 8/2015 |

OTHER PUBLICATIONS

LAN/MAN Standards Committee of the IEEE Computer Society, "Part 11: Wireless LAN Medium Access Control (Mac) and Physical Layer (PHY) Specifications," IEEE Std 802.11™-2016, IEEE Standard for Information technology—Telecommunications and information exchange between systems Local and metropolitan area networks—Specific requirements, Dec. 14, 2016, pp. 1377-1392, 17 pages.

*Primary Examiner* — Xuan Lu
(74) *Attorney, Agent, or Firm* — Fish & Richardson P.C.

(57) ABSTRACT

A terminal apparatus includes: a measurement unit configured to measure at least one of a latency when a wireless signal is transmitted to a access point and a jitter of the wireless signal; a data processing unit configured to generate information including a result of the measurement; and a wireless communication processing unit configured to transmit the information to the access point.

12 Claims, 17 Drawing Sheets

(51) Int. Cl.
*H04W 24/10* (2009.01)
*H04W 28/02* (2009.01)

(56) References Cited

U.S. PATENT DOCUMENTS

| | | | |
|---|---|---|---|
| 2010/0165856 A1* | 7/2010 | Melpignano | H04W 28/0242 370/252 |
| 2013/0250786 A1* | 9/2013 | Balasaygun | H04L 41/5032 370/252 |
| 2016/0219627 A1* | 7/2016 | Au | H04W 74/0841 |
| 2018/0146432 A1* | 5/2018 | Li | H04W 52/0212 |
| 2018/0302194 A1* | 10/2018 | Wang | H04L 1/1664 |
| 2020/0374802 A1* | 11/2020 | Chu | H04W 48/18 |
| 2021/0297188 A1* | 9/2021 | Xu | H04L 1/1822 |
| 2022/0225323 A1* | 7/2022 | Wang | H04W 72/56 |
| 2022/0240311 A1* | 7/2022 | Kim | H04W 74/08 |
| 2022/0248287 A1* | 8/2022 | Chong | H04W 24/02 |
| 2022/0346174 A1* | 10/2022 | Wang | H04W 76/18 |

* cited by examiner

TERMINAL APPARATUS, COMMUNICATION METHOD, AND COMMUNICATION PROGRAM

CROSS-REFERENCE TO RELATED APPLICATIONS

This application is a National Stage application under 35 U.S.C. § 371 of International Application No. PCT/JP2020/000668, having an International Filing Date of Jan. 10, 2020. The disclosure of the prior application is considered part of the disclosure of this application, and is incorporated in its entirety into this application.

TECHNICAL FIELD

Embodiments relate to a terminal apparatus, a communication method, and a communication program.

BACKGROUND ART

Access points and terminal apparatuses in a wireless LAN access channels using carrier sense multiple access with collision avoidance (CSMA/CA) and transmit wireless signals. In CSMA/CA, the access points and the terminal apparatuses wait for periods of time defined by access parameters, confirm that channels are not being used by other terminal apparatuses or the like through carrier sensing, and then transmit wireless signals.

As one priority control scheme in a wireless LAN, enhanced distribution channel access (EDCA) has been defined. In EDCA, traffic from upper layers is categorized into any of four access categories (AC), that is AC_VO (voice), AC_VI (video), AC_BE (best effort), and AC_BK (background). Also, in EDCA, CSMA/CA is carried out for each access category. In EDCA, access parameters are allocated such that transmission of wireless signals is relatively prioritized in order of AC_VO, AC_VI, AC_BE, and AC_BK.

CITATION LIST

Non Patent Literature

NPL 1: IEEE Std 802.11-2016, "10.22.2 HCF contention based channel access (EDCA)," 7 Dec. 2016

SUMMARY OF THE INVENTION

Technical Problem

EDCA assigns relative priority among traffic. Here, a real-time application (RTA) such as control of a network game and an industrial robot, for example, may have requirements such as an absolute latency and a jitter for each application. The relative prioritization alone does not indicate whether the RTA is available, or whether control is available to make the RTA available

Means for Solving the Problem

A terminal apparatus according to an aspect includes: a measurement unit, a data processing unit, and a wireless signal processing unit. The measurement unit measures at least one of a latency when a wireless signal is transmitted to a access point and a jitter of the wireless signal. The data processing unit generates information including a result of the measurement. The wireless signal processing unit transmits the information to the access point.

Advantageous Effects of the Invention

According to the embodiment, information for determining whether requirements are satisfied can be provided even with absolute requirements for a latency or jitter.

DESCRIPTION OF EMBODIMENTS

Figure 1:
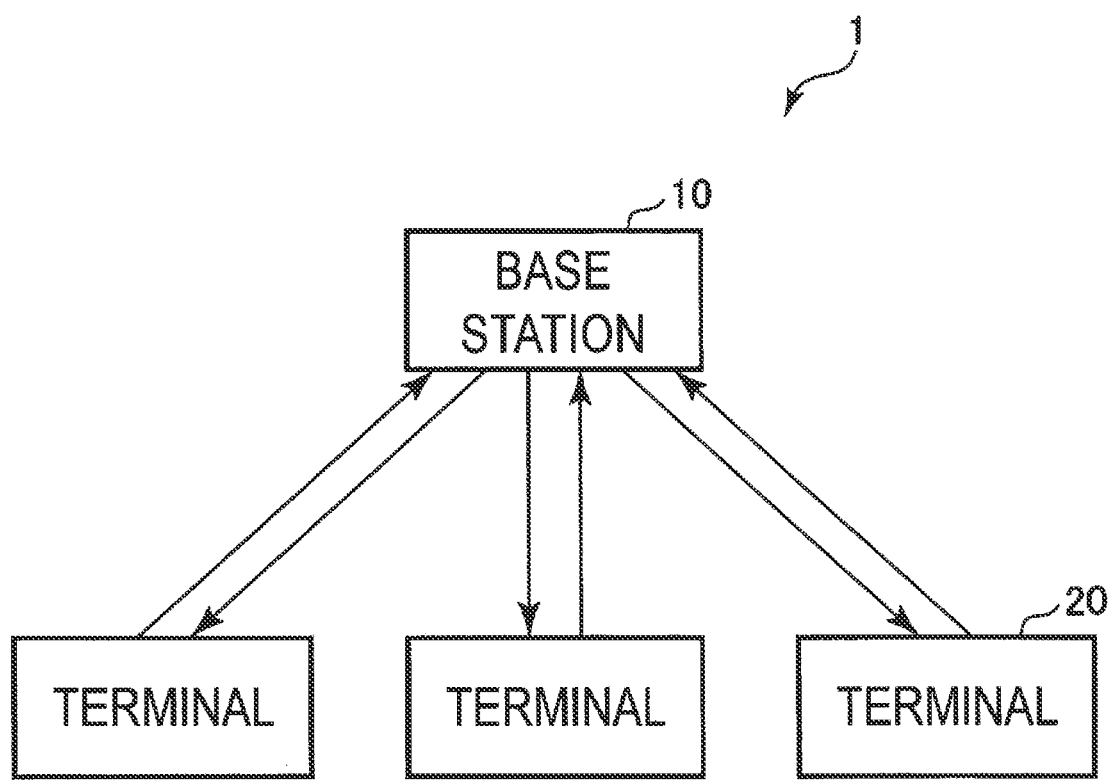
FIG. 1 is a diagram illustrating a configuration of an example of a communication system according to an embodiment.

Hereinafter, embodiments will be described based on the drawings. FIG. 1 is a diagram illustrating a configuration of an example of a communication system according to an embodiment. A communication system 1 includes a access point 10 and terminals 20. The access point 10 performs wireless LAN communication with terminals inside a predefined service area. Although not illustrated in FIG. 1, communication may be performed between the terminals 20.

Figure 2:
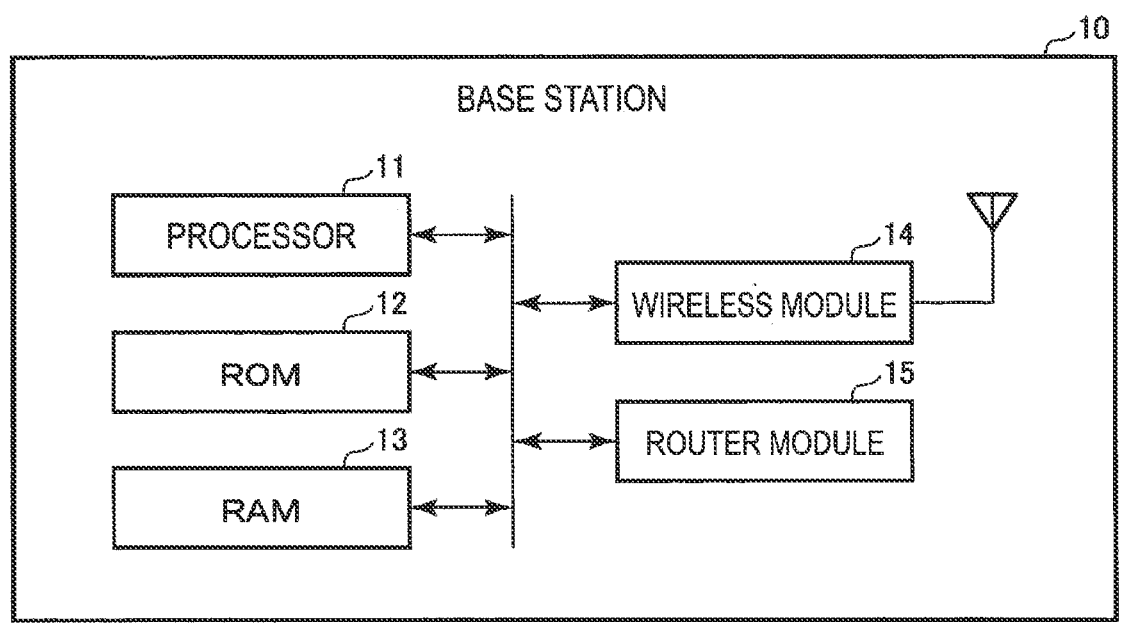
FIG. 2 is a diagram illustrating an exemplary hardware configuration of a access point

FIG. 2 is a diagram illustrating an exemplary hardware configuration of the access point 10. The access point 10 is an access point (AP) for the terminals 20. The access point 10 is not necessarily fixed, and may be mounted in a mobile body.

The access point 10 includes a processor 11, a read only memory (ROM) 12, a random access memory (RAM) 13, a wireless module 14, and a router module 15.

The processor 11 is a processing device that performs overall control for the access point 10. The processor 11 is, for example, a central processing unit (CPU). The processor 11 is not limited to a CPU. Also, an application specific IC (ASIC) or the like may be used instead of a CPU. In addition, the number of processors 11 may not be one, and it may be two or more.

The ROM 12 is a storage device dedicated to reading. The ROM 12 stores firmware and various programs required for operations of the access point 10.

The RAM 13 is a storage device in which writing can be arbitrarily performed. The RAM 13 is used as a work area for the processor 11 and temporarily stores the firmware and the like stored in the ROM 12.

The wireless module 14 is a module configured to perform processing required for wireless LAN communication. The wireless module 14 forms a MAC frame from data transferred from the processor 11, for example, converts the formed MAC frame into a wireless signal, and transmits the wireless signal to the terminal 20. Also, the wireless module 14 receives a wireless signal from the terminal 20, extracts data from the received wireless signal, and transfers the data to the processor 11, for example.

The router module 15 is provided for the access point 10 to communicate with a server, which is not illustrated, for example, via a network. Note that the access point 10 may not necessarily include the router module 15. The access point 10 may be configured to access a router provided outside the access point 10 through wireless communication or wired communication and connect to the network via the router.

Figure 3:
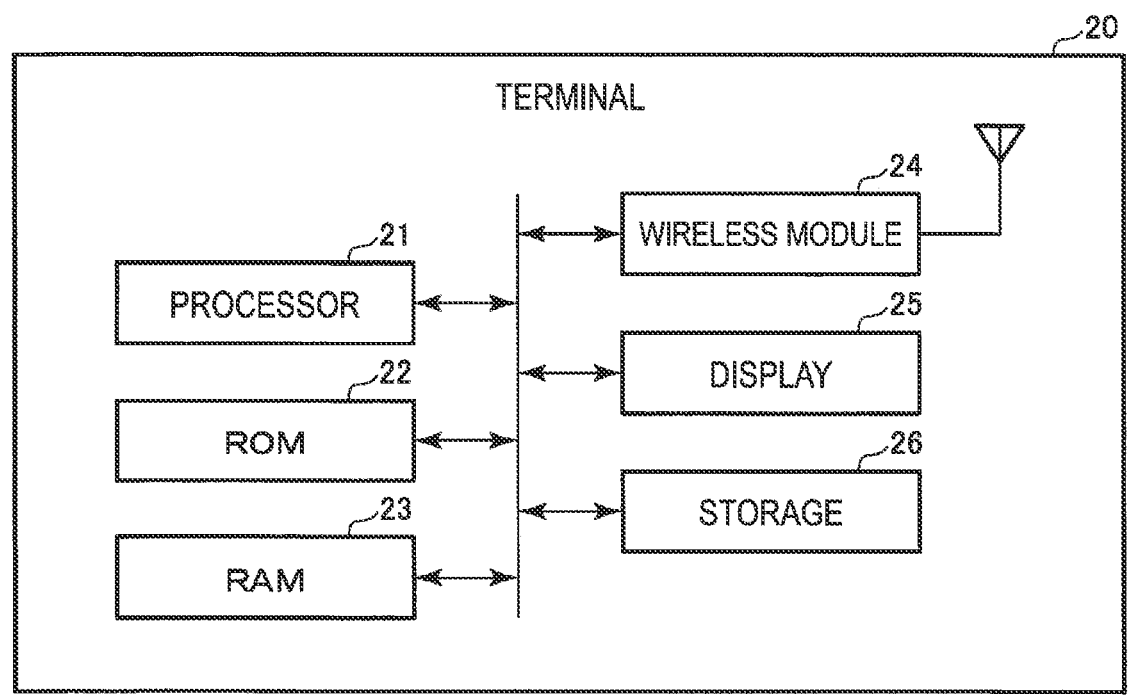
FIG. 3 is a diagram illustrating an exemplary hardware configuration of a terminal.

FIG. 3 is a diagram illustrating an exemplary hardware configuration of the terminal 20. The terminal 20 is a terminal apparatus (station) such as a smartphone. The terminal 20 may be a mobile terminal, a terminal mounted in a mobile object, or a fixed terminal.

The terminal 20 includes a processor 21, a ROM 22, a RAM 23, a wireless module 24, a display 25, and a storage 26.

The processor 21 is a processing device that controls the entire terminal 20. The processor 21 is, for example, a CPU. The processor 21 is not limited to a CPU. Also, an ASIC or the like may be used instead of a CPU. In addition, the number of processors 21 may not be one and it may be two or more.

The ROM 22 is a storage device dedicated to reading. The ROM 22 stores firmware and various programs required for operations of the terminal 20.

The RAM 23 is a storage device in which writing can be arbitrarily performed. The RAM 23 is used as a work area for the processor 21 and temporarily stores the firmware and the like stored in the ROM 22.

The wireless module 24 is a module configured to perform processing required for wireless LAN communication. The wireless module 24 forms a MAC frame for wireless communication from data transferred from the processor 21, for example, converts the formed MAC frame into a wireless signal, and transmits the wireless signal to the access point 10. Also, the wireless module 24 receives a wireless signal from the access point 10, extracts data from the received wireless signal, and transfers the data to the processor 21, for example.

The display 25 is a display device that displays various screens. The display 25 may be a liquid crystal display, an organic EL display, or the like. Also, the display 25 may include a touch panel.

The storage 26 is a storage device such as a hard disk. The storage 26 stores various applications executed by the processor 21, for example.

Figure 4:
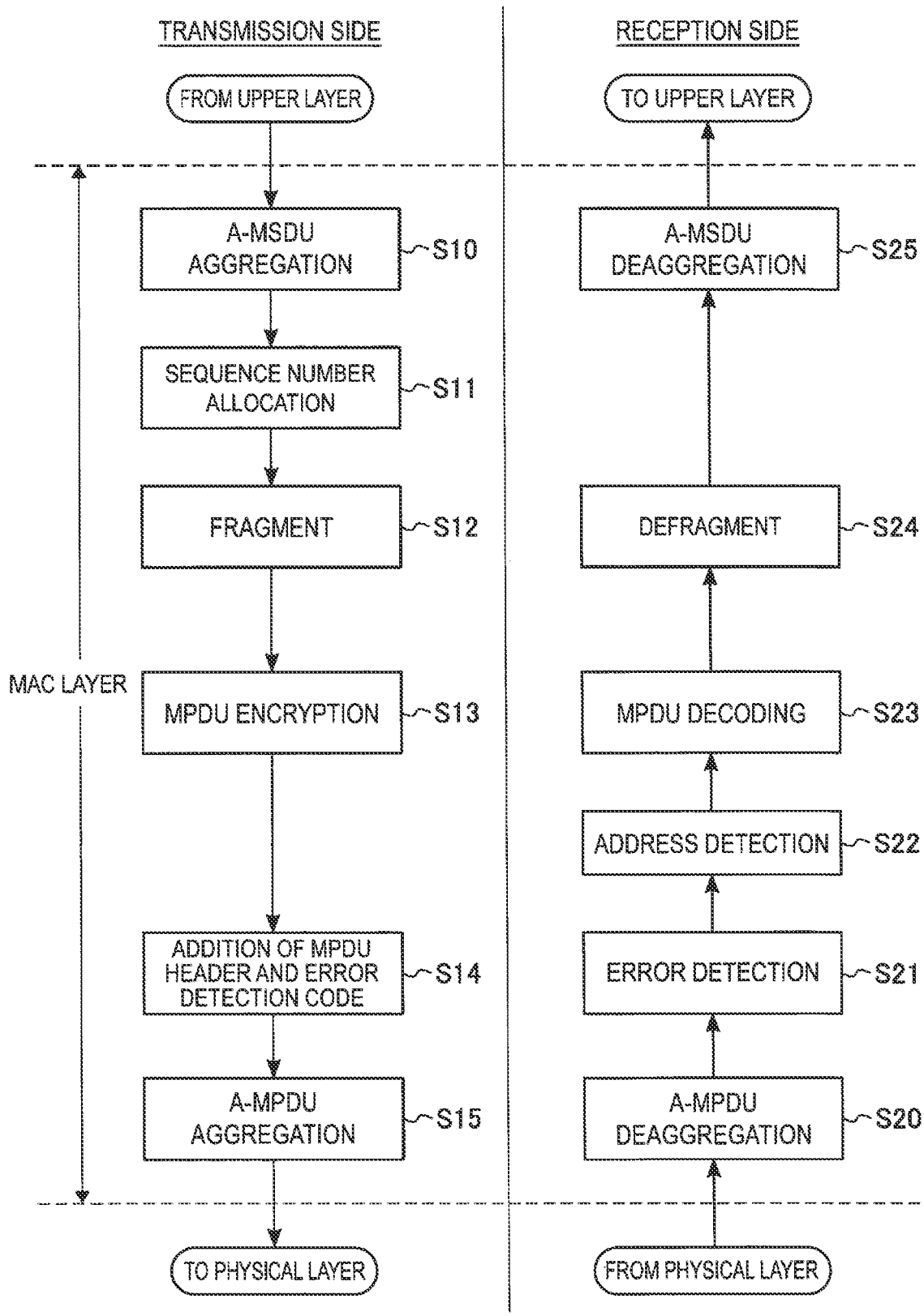
FIG. 4 is a diagram illustrating processing of a media access control (MAC) layer during communication between the access point and the terminal.

FIG. 4 is a diagram illustrating processing of a media access control (MAC) layer during communication between the access point 10 and the terminal 20. FIG. 4 illustrates both processing on a transmission side and processing on a reception side. When a wireless module of one of the access point 10 and the terminal 20 performs the processing on the transmission side, a wireless module of the other of the basestation 10 and terminal 20 performs the processing on the reception side. In the following example, the wireless modules on the transmission side and the reception side will be described without any distinction.

First, the processing on the transmission side will be described. In Step S10, the wireless module performs A-MSDU aggregation. Specifically, the wireless module unifies a plurality of items of data input from an upper layer such as an application layer to generate an aggregate-MAC service data unit (A-MSDU).

In Step S11, the wireless module assigns a sequence number (SN) to the A-MSDU. The sequence number is a unique number for identifying the A-MSDU.

In Step S12, the wireless module fragments (splits) the A-MSDU into a plurality of MAC protocol data units (MPDUs).

In Step S13, the wireless module encrypts each MPDU to generate an encrypted MPDU.

In Step S14, the wireless module adds a MAC header and an error detection code (FCS) to each encrypted MPDU. The error detection code is, for example, a cyclic redundancy check (CRC) code.

In Step S15, the wireless module performs A-MPDU aggregation. Specifically, the wireless module unifies the plurality of MPDUs to generate an aggregate-MAC protocol data unit (A-MPDU) as a MAC frame.

After Step S15, the wireless module performs processing of a physical layer on the MAC frame. In other words, the wireless module performs modulation processing or the like on the MAC frame to generate a wireless signal and transmits the wireless signal to the access point 10.

Next, the processing on the reception side will be described. When a wireless signal is received, the wireless module performs processing of the physical layer to restore a MAC frame from a wireless signal. Thereafter, the wireless module performs processing of the MAC layer illustrated in FIG. 4.

In Step S20, the wireless module performs A-MPDU deaggregation. Specifically, the wireless module splits A-MPDU in units of MPDUs.

In Step S21, the wireless module performs error detection. For example, the wireless module determines whether the wireless signal has successfully been received through CRC. When the reception of the wireless signal has failed, the wireless module may provide a retransmission request. At this time, the wireless module may request retransmission in units of MPDUs. On the other hand, when the wireless signal has successfully been received, the wireless module performs the following processing.

In Step S22, the wireless module performs address detection. At this time, the wireless module determines whether the transmitted MPDU is directed to the wireless module itself based on an address recorded in the MAC header of each MPDU. When the MPDU is not directed to the wireless module itself, the wireless module does not perform the following processing. When the MPDU is directed to the wireless module itself, the wireless module performs the following processing.

In Step S23, the wireless module dycripts encrypted MPDUs.

In Step S24, the wireless module performs defragmenting on the MPDUs. In other words, the wireless module restores the A-MSDU from the plurality of MPDUs.

In Step S25, the wireless module performs A-MSDU deaggregation. Specifically, the wireless module restores the A-MSDU to data in units of MSDUs.

After Step S25, the wireless module outputs the data to the upper layer of the MAC layer. The upper layer is, for example, an application layer.

Figure 5:
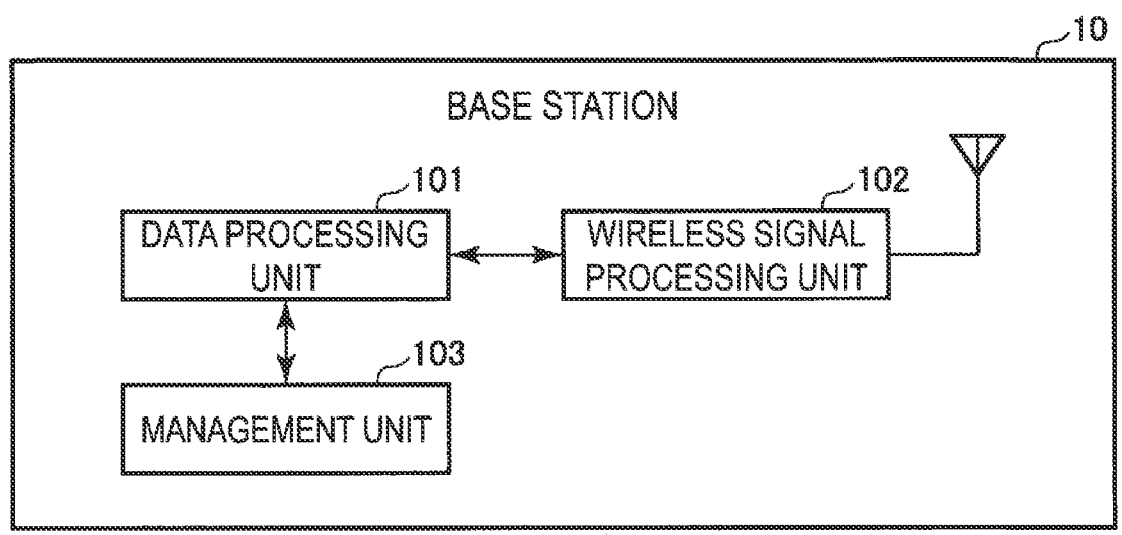
FIG. 5 is a functional block diagram of the access point.

FIG. 5 is a functional block diagram of the access point 10. The access point 10 includes a data processing unit 101, a wireless signal processing unit 102, and a management unit 103. The data processing unit 101, the wireless signal processing unit 102, and the management unit 103 are realized by the processor 11 and the wireless module 14, for example.

The data processing unit 101 forms a MAC frame from data transferred from the server in the network, for example. Also, the data processing unit 101 restores data from the MAC frame transferred from the wireless signal processing unit 102. The data includes a report transmitted from the terminal 20.

The wireless signal processing unit 102 performs processing for transmitting or receiving a wireless signal. For example, the wireless signal processing unit 102 converts the MAC frame formed by the data processing unit 101 into a wireless signal and transmits the wireless signal to the terminal 20. Also, the wireless signal processing unit 102 receives a wireless signal from the terminal 20, extracts a MAC frame from the received wireless signal, and transfers the MAC frame to the data processing unit 101.

The management unit 103 manages a report transmitted from the terminal 20. For example, the management unit 103 holds the report and uses information held in the report at a necessary timing. The report includes information regarding a latency or a jitter of transmission of the wireless signal in the terminal 20. Details of the report will be described below.

Here, the wireless signal processing unit 102 may be configured to transmit a wireless signal by EDCA, for example. In this case, the wireless signal processing unit 102 includes transmission queues AC_VO, AC_VI, AC_BE, and AC_BK for access categories (AC). The transmission queue AC_VO is a queue for holding a MAC frame categorized into VO (voice). The transmission queue AC_VI is a queue for holding a MAC frame categorized into VI (video). The transmission queue AC_BE is a queue for holding a MAC frame categorized into BE (best effort). The transmission queue AC_BK is a queue for holding a MAC frame categorized into BK (background).

The wireless signal processing unit 102 maps the MAC frame transferred from the data processing unit 101 to any of the four access categories in accordance with a category of data recorded in the MAC frame. The wireless signal processing unit 102 inputs the MAC frame to a corresponding transmission queue in accordance with a result of the mapping.

The wireless signal processing unit 102 confirms, through carrier sense for each access category, that there has been no transmission of any wireless signal by another terminal or the like and waits a period of time defined by an access parameter set for each access category for transmission. If there has been no transmission of any wireless signal by another terminal or the like when the wireless signal processing unit 102 is waiting, the wireless signal processing unit 102 extracts a MAC frame from a corresponding transmission queue, converts the MAC frame into a wireless signal, and transmits the wireless signal.

Here, the access parameter may be allocated such that relative priority is placed on transmission of wireless signals in an order of VO, VI, BE, and BK. The access parameter may include CWmin, CWmax, AIFS, and TXOP Limit. CWmin and CWmax are the maximum value and the minimum value, respectively, of a contention window (CW) which is a time for waiting for transmission. A transmission queue can more easily obtain a transmission right as CWmin and CWmax are shorter. An arbitration inter frame space (AIFS) is a transmission interval of a wireless signal. Priority of the transmission queue increases as the AIFS decreases. TXOP Limit is an upper limit value of a transmission opportunity (TXOP), which is a channel occupation time. It is possible to transmit more wireless signals with one transmission right as the value of TXOP Limit increases.

Figure 6:
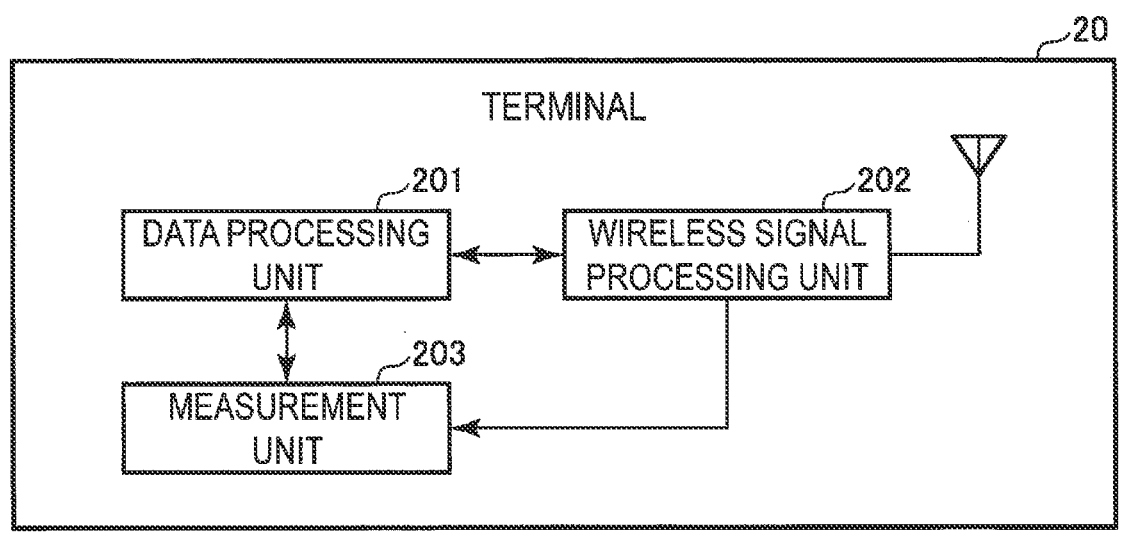
FIG. 6 is a functional block diagram of the terminal.

FIG. 6 is a functional block diagram of the terminal 20. The terminal 20 includes a data processing unit 201, a wireless signal processing unit 202, and a measurement unit 203. The data processing unit 201, the wireless signal processing unit 202, and the measurement unit 203 are realized by the processor 21 and the wireless module 24, for example.

The data processing unit 201 forms a MAC frame from data input from an upper application, or the like. Also, the data processing unit 201 restores data from a MAC frame transferred from the wireless signal processing unit 202. The data is used by the upper application, for example. Moreover, the data processing unit 201 generates a report including a result of the measurement performed by the measurement unit 203. Then, the data processing unit 201 forms a MAC frame from the report. Here, the application is not limited to a specific application. For example, the application may be an RTA such as a control application for a network game or an industrial robot.

The wireless signal processing unit 202 performs processing for transmitting or receiving a wireless signal. For example, the wireless signal processing unit 202 converts the MAC frame formed by the data processing unit 201 into a wireless signal and transmits the wireless signal to the access point 10, for example. Also, the wireless signal processing unit 202 receives a wireless signal from the access point 10, extracts a MAC frame from the received wireless signal, and transfers the MAC frame to the data processing unit 201. Here, the wireless signal processing unit 202 may be configured to transmit the wireless signal by EDCA, for example, similarly to the access point 10.

The measurement unit 203 measures at least one of a latency of transmission of a wireless signal and a jitter of the wireless signal in the terminal 20. The latency is measured from a time required until acknowledge (ACK) from the access point 10 is received after the wireless signal processing unit 202 transmits the wireless signal, for example. Also, the latency may be measured from a queue waiting time until the MAC frame reaches a head of a transmission queue after the MAC frame is input to an end of the transmission queue. In addition, the latency may be measured from a transmission waiting time until transmission is performed after the MAC frame reaches the head of the transmission queue. Also, the latency may be measured from a required retransmission time until retransmission is performed after retransmission is requested. A plurality of latencies among these may be measured. The jitter is measured from dispersion with respect to an average value of the latencies, for example. A method for measuring the latency and a method for measuring the jitter are not limited to specific methods. Note that time information used for the measurement may be provided by a common clock (not illustrated) included in the terminal to each functional unit.

Figure 7A:
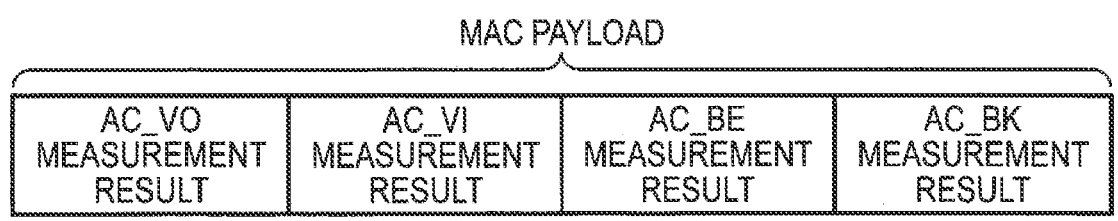
FIG. 7A is a diagram illustrating a first example of a format of a MAC payload of a report.

FIG. 7A is a diagram illustrating a first example of a format of a MAC payload of the report. The payload of the report includes a data field for a result of measurement for each access category. The measurement result is at least one of a latency measurement result and a jitter measurement result. The measurement result may be a measurement value of the latency or the jitter obtained in individual events of measurement or may be a statistical value calculated by performing statistical processing on measurement values obtained in measurement performed a plurality of times. The statistical value includes, for example, an average value, a median value, a maximum value, and a minimum value. The payload of the report may store any one of these statistical values for each access category or may store a plurality of statistical values for each access category. Here, it is desirable to exclude outliers that significantly deviate from other measurement results from among results of measurement performed a plurality of times when the statistical values such as an average value, a median value, a maximum value, and a minimum value are calculated. Also, in a case in which both the latency and the jitter are measured, the number of measurement values used to calculate the average value may be reduced, for example, because outliers are likely to occur when the jitter is large.

Figure 8A:
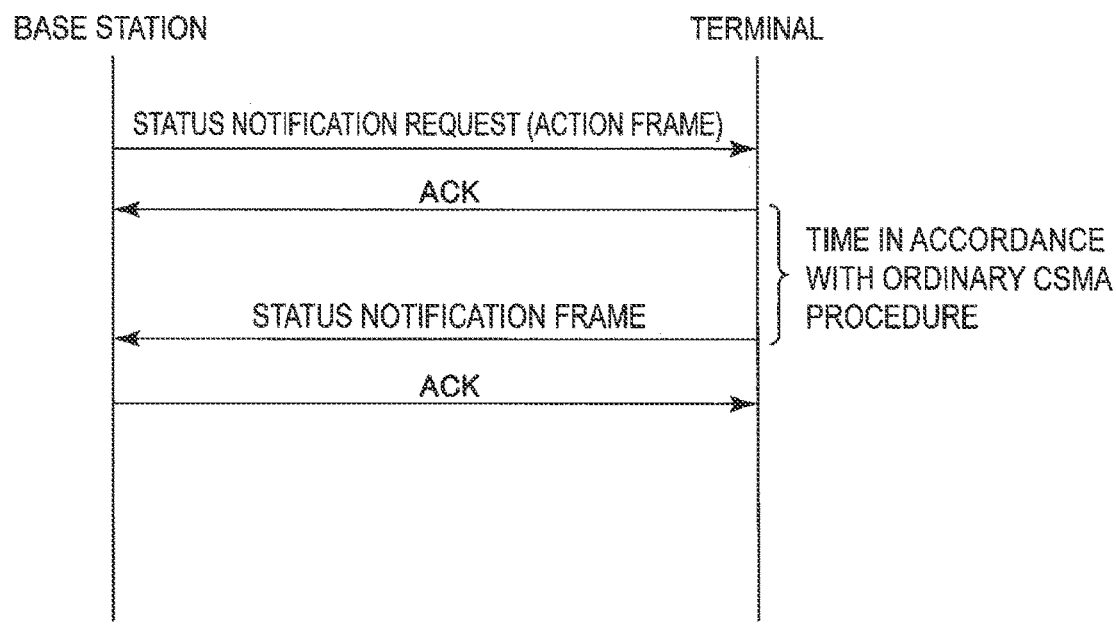
FIG. 8A is a diagram illustrating a first example in which the access point requests a report using an Action frame.
Figure 8B:
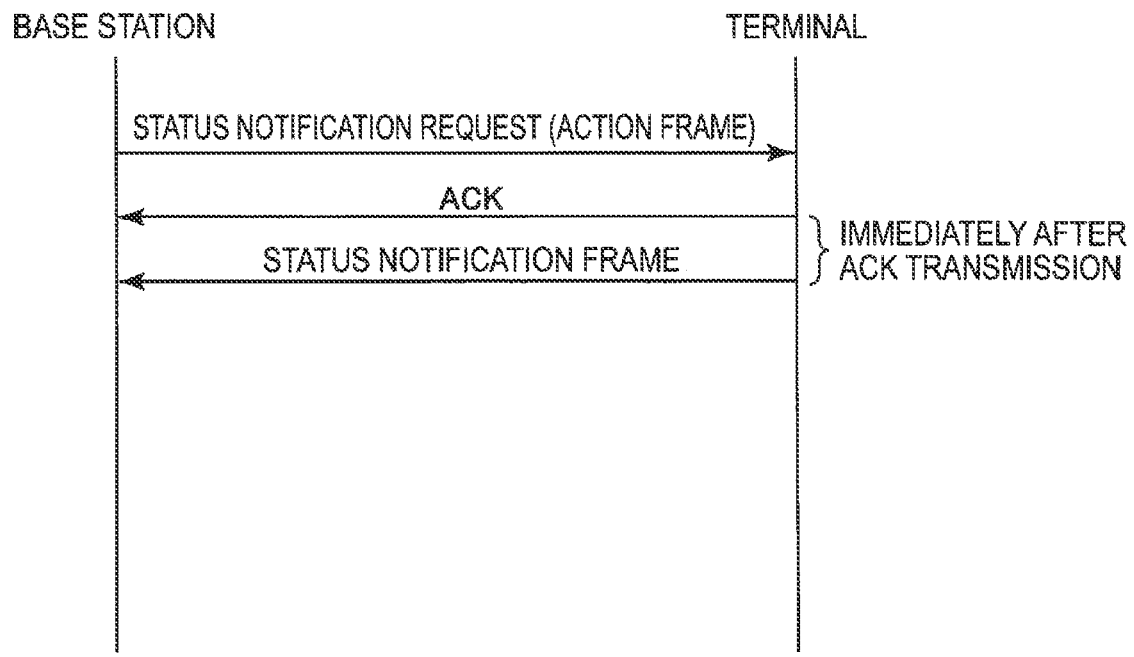
FIG. 8B is a diagram illustrating a second example in which the access point requests a report using an Action frame.
Figure 9A:
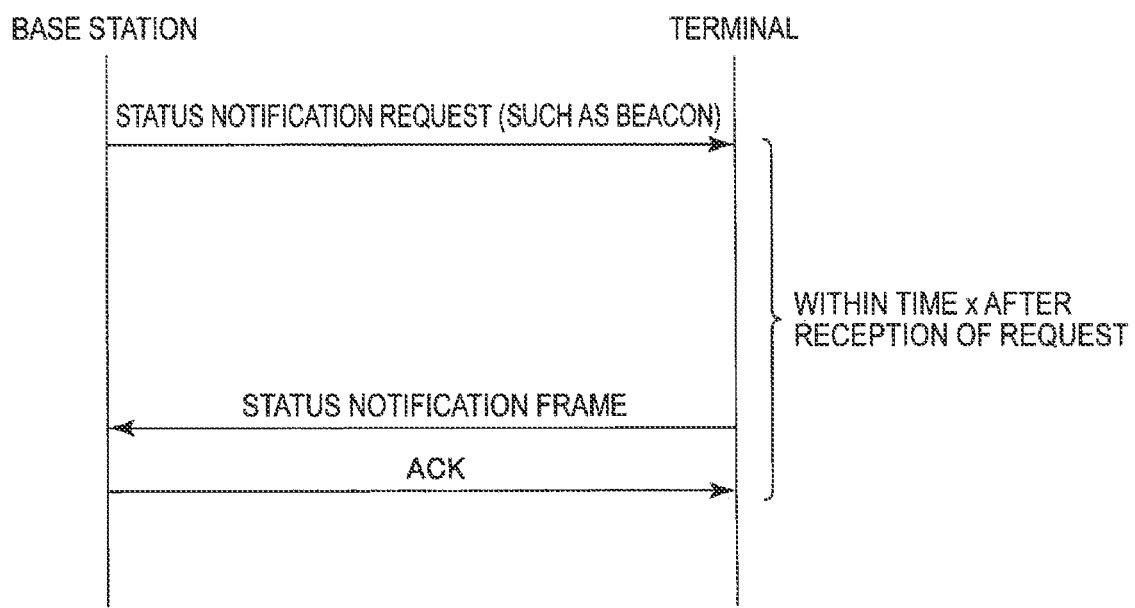
FIG. 9A is a diagram illustrating a first example in which the access point requests a report using a management frame or a control frame.
Figure 9B:
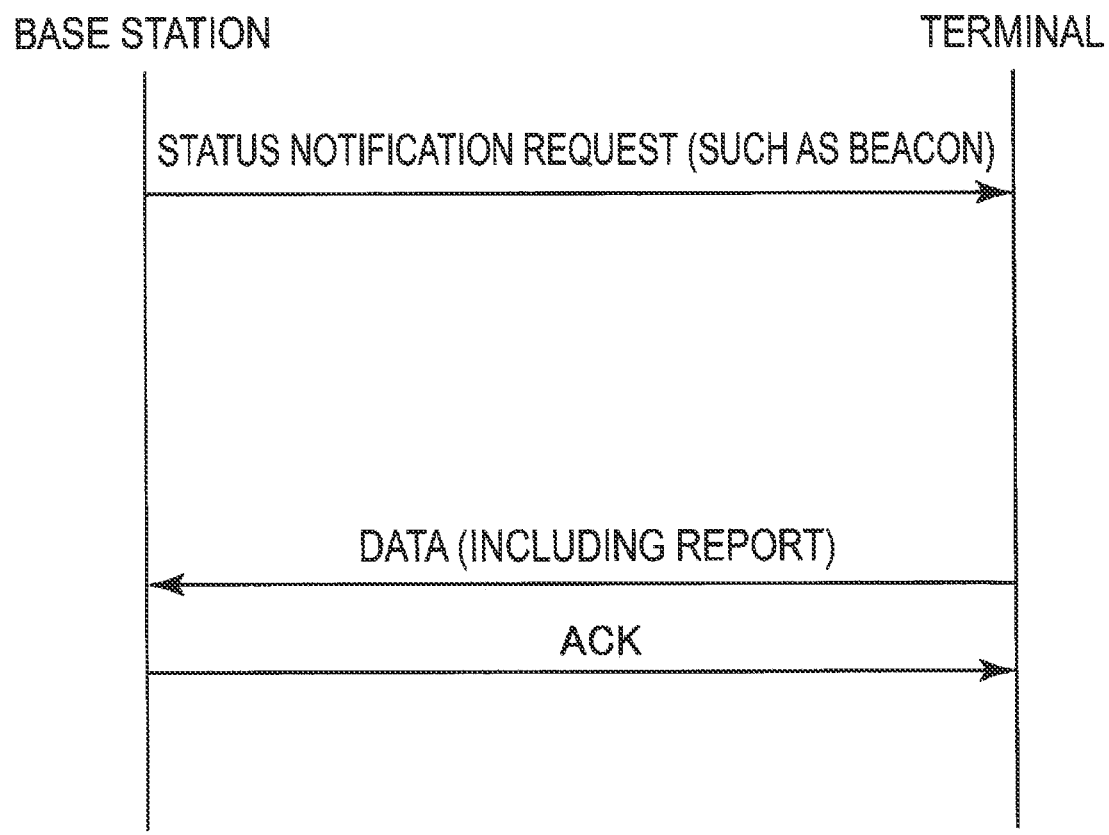
FIG. 9B is a diagram illustrating a second example in which the access point requests a report using a management frame or a control frame.

For example, the report illustrated in FIG. 7A can be transmitted using an Action frame in the IEEE 802.11 standard. In a case in which the access point requests a report from each terminal, for example, the report may be requested with an Action frame to which a new field including a status notification request for requesting a report has been added. The terminal replies with the report through reception of the Action frame. When the report is replied with, the terminal may use an Action frame to which a new field storing the result of measuring the latency and the like has been added. In this case, the terminal may reply with the report through an ordinary CSMA/CA procedure after reception of a request from the access point as illustrated in FIG. 8A. Also, as illustrated in FIG. 8B, the terminal may reply with the report immediately after the request from the access point is received, without performing the CSMA/CA procedure, for example, after elapse of a short inter frame space (SIFS) or a PCF inter frame space (PIFS). Also, the access point may periodically provide a notification of a management frame or a control frame for requesting a report, and each terminal may transmit a report. For example, the access point may include a request for a report in a periodically transmitted frame, such as a beacon. The terminal may reply with the report in the Action frame in response to the request for the report as illustrated in FIG. 9A. Also, the terminal may add the report to the data frame as illustrated in FIG. 9B. In a case in which the terminal transmits data with a restriction of a latency, for example, the terminal can notify the access point of a latency status in relatively real time by adding information regarding a latency and the like measured when the same type (access category or the like) of data is previously transmitted. In a case in which the report is added to the data frame, the terminal may add a new field storing information regarding a latency and the like to a header of the data frame, for example.

Also, the measurement result is assumed to be stored for each access category in FIG. 7A. However, the payload of the report may not necessarily be stored for each access category. For example, wireless LAN transmission control schemes include schemes that do not include priority control for each access category. In this case, the measurement result is not required to be stored for each access category. Also, the measurement result may be stored for each traffic type (TID) instead of each access category. The TID is applied in units of applications (sessions) handled by the terminal 20. The mapping to the aforementioned access category may be performed based on the TID. It is possible to measure a latency and a jitter distinguished for each application by the measurement result being stored for each TID.

Figure 7B:
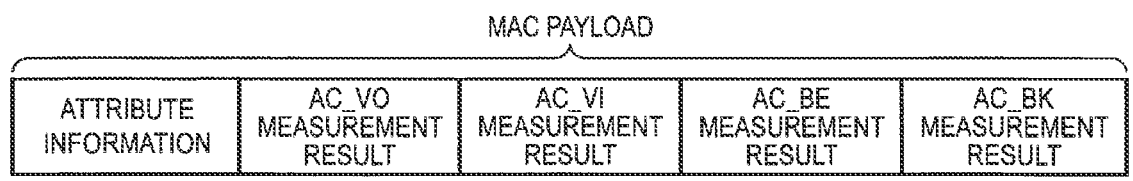
FIG. 7B is a diagram illustrating a second example of a format of a MAC payload of a report.

FIG. 7B is a diagram illustrating a second example of a format of a MAC payload of the report. The payload of the report includes attribute information of the measurement result in addition to the data field of the measurement result for each access category. The attribute information includes information related to the terminal, such as the position of the terminal 20 at the time of measuring a latency or a jitter, for example, the type of terminal 20, and the type of application that is being executed by the terminal 20.

Next, operations of the communication system 1 will be described. In the following description, it is assumed that the terminal 20 transmits a wireless signal while the access point 10 receives the wireless signal.

Figure 10:
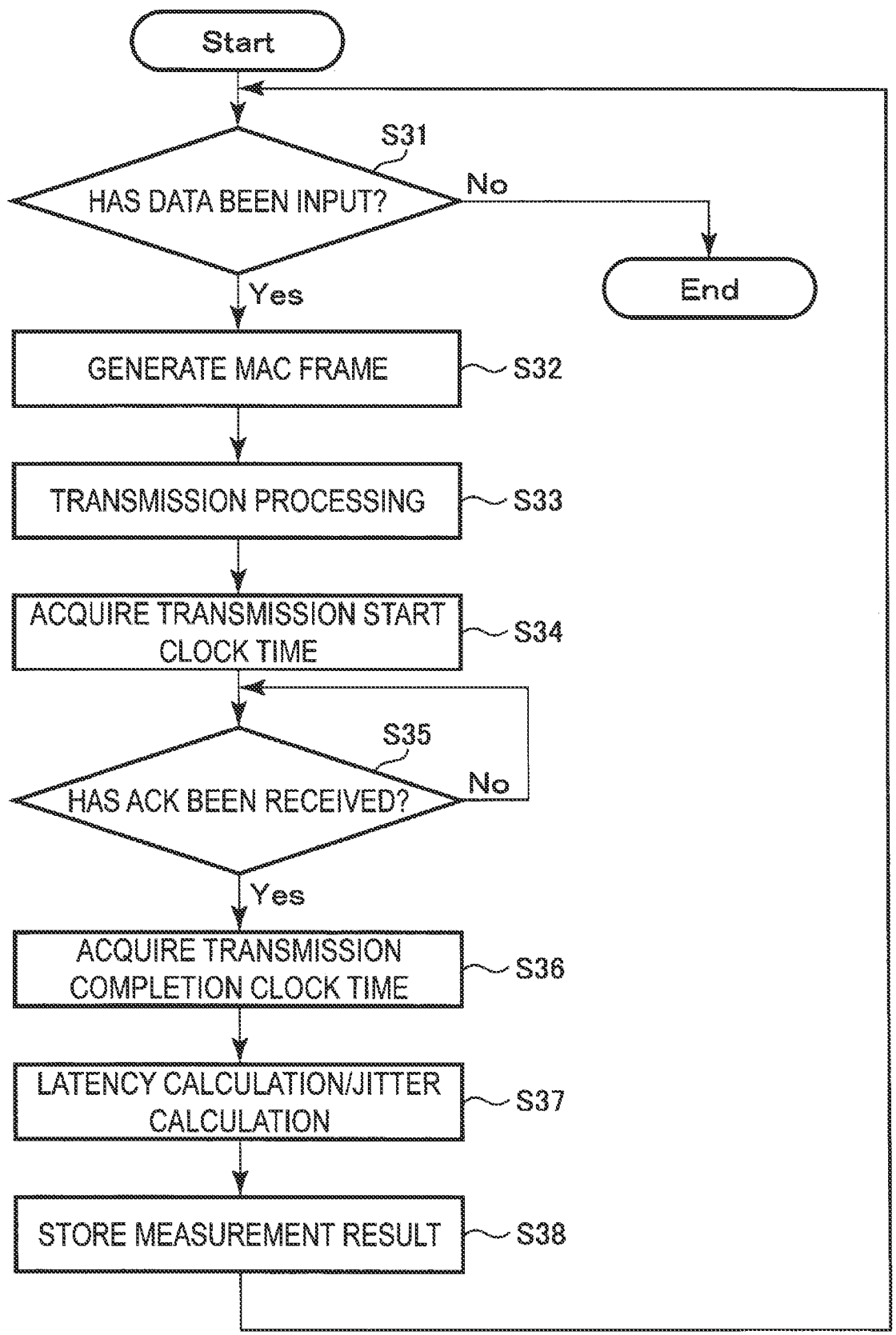
FIG. 10 is a flowchart illustrating exemplary transmission processing of the terminal.

FIG. 10 is a flowchart illustrating exemplary transmission processing of the terminal 20. In Step S31, the data processing unit 201 determines whether data to be transmitted has been input from the upper layer such as an application layer. When it is determined in Step S31 that no data has been input, the processing in FIG. 10 ends. When it is determined in Step S31 that data has been input, the processing proceeds to Step S32.

In Step S32, the data processing unit 201 performs the processing of the MAC layer illustrated in FIG. 4 on the input data to generate a MAC frame. The data processing unit 201 outputs the MAC frame to the wireless signal processing unit 202.

In Step S33, the wireless signal processing unit 202 performs transmission processing using EDCA. In other words, the wireless signal processing unit 202 inputs the MAC frame to a transmission queue of the access category corresponding to the category of the data. Also, the wireless signal processing unit 202 determines a channel state through carrier sense and waits for transmission in accordance with a period of time defined by the access parameter for each access category. Also, the wireless signal processing unit 202 converts the MAC frame into a wireless signal and transmits the wireless signal if the channel is not being used by another terminal or the like.

In Step S34, the wireless signal processing unit 202 acquires, as a transmission start clock time, a clock time at which the wireless signal is transmitted. The wireless signal processing unit 202 outputs, to the measurement unit 203, the transmission start clock time along with the sequence number allocated to the MAC frame and the access category to which the MAC frame is mapped.

In Step S35, the wireless signal processing unit 202 determines whether acknowledge (ACK) from the access point 10 has been received. In Step S35, the wireless signal processing unit 202 waits for processing until ACK is received. When it is determined that ACK has been received in Step S35, the processing proceeds to Step S36. Although not illustrated in FIG. 10, the wireless signal processing unit 202 may retransmit the MAC frame when a retransmission request is received from the access point 10. The retransmission may be performed in units of MPDUs.

In Step S36, the wireless signal processing unit 202 acquires, as a transmission completion clock time, a clock time at which ACK has been received. The wireless signal processing unit 202 outputs, to the measurement unit 203, the transmission completion clock time, along with the sequence number assigned to the MAC frame and the access category to which the MAC frame is mapped.

In Step S37, the measurement unit 203 calculates a latency and a jitter for each access category. The latency is calculated from a time difference between the transmission completion clock time and the transmission start clock time, for example. On the other hand, the jitter can be calculated from dispersion with respect to an average value of the latency, for example. The measurement unit 203 outputs, to the data processing unit 201, the measurement result along with the access category and the sequence number.

In Step S38, the data processing unit 201 stores the result of measuring the latency and the jitter. Thereafter, the processing returns to Step S31. The result of the measurement may be stored in the storage 26, for example.

Figure 11:
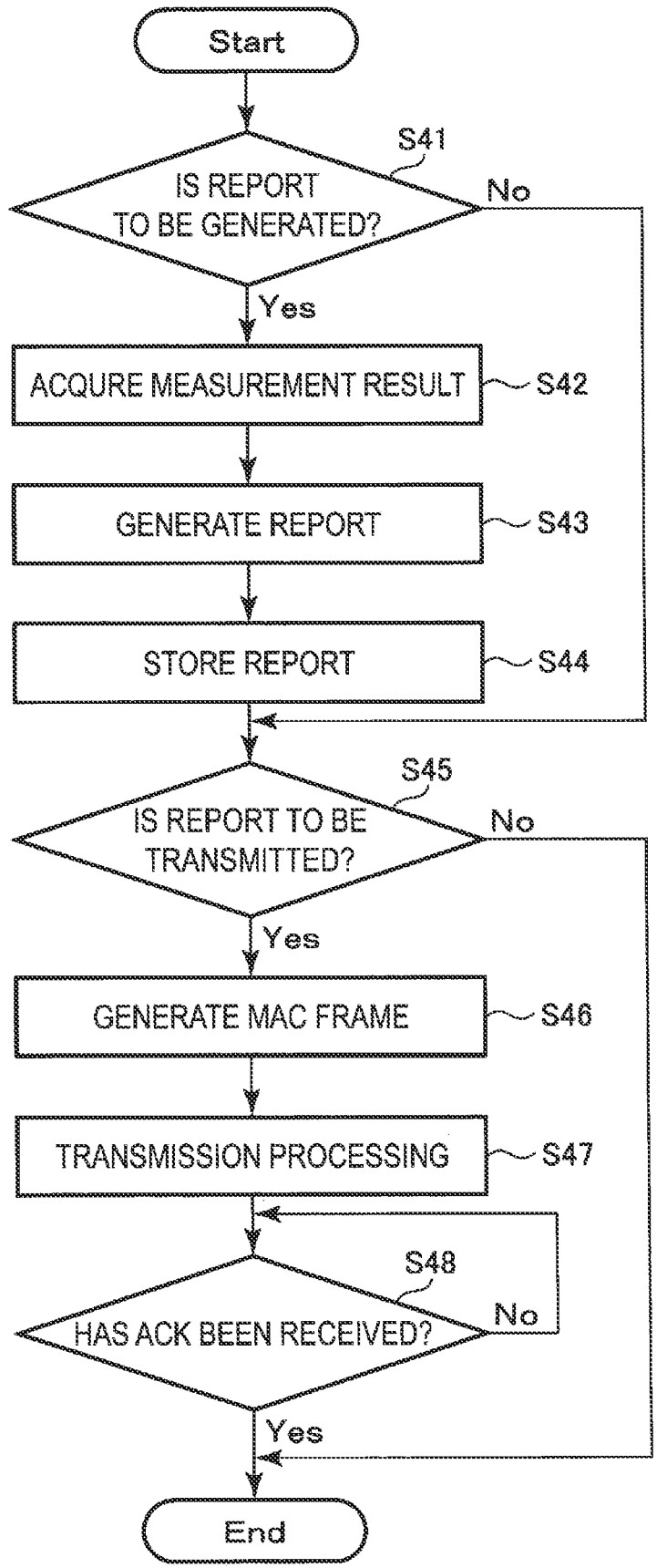
FIG. 11 is a flowchart illustrating report processing of the terminal.

FIG. 11 is a flowchart illustrating report processing performed by the terminal 20. The report processing is performed every specific period of time, such as every hour, every day, or every week. The specific period of time may be appropriately set. In addition, the report processing may be immediately performed in addition to the periodic processing in a case in which the measurement value or the statistical value exceeds a threshold value that is a requirement set by an application or the like.

In Step S41, the data processing unit 201 determines whether a report is to be generated. It is determined that the report is to be generated when a specific period of time has elapsed, when sufficient measurement results to calculate the statistical value have been obtained, or when a request is received from the access point 10, for example. When it is determined that the report is not to be generated in Step S41, the processing proceeds to Step S45. When it is determined in Step S41 that the report is to be generated, the processing proceeds to Step S42. The data processing unit 201 may determine, using an Action frame, that the report is to be generated in a case in which a request for transmitting a report is received from the access point. In a case in which a latency and the like at the time of previous transmission of the data frame are added every time the data frame is transmitted, it may be used as a trigger for determining that a report of transmitting the data frame is generated.

In Step S42, the data processing unit 201 acquires the result of the measurement stored in the storage 26, for example, for each access category.

In Step S43, the data processing unit 201 generates the report illustrated in FIG. 7A or 7B. The data processing unit 201 performs statistical processing of calculating an average value or the like of the acquired result of measurement for each access category as needed.

In Step S44, the data processing unit 201 stores the report. The report may be stored in the storage 26, for example.

In Step S45, the data processing unit 201 determines whether the report is to be transmitted to the access point 10. It is determined that the report is to be transmitted when a specific period has elapsed, when the measurement value or the statistical value has exceeded a threshold value that is a requirement set by the application or the like, or when a request is received from the access point 10, for example. When it is determined in Step S45 that the report is to be transmitted, the processing proceeds to Step S46. When it is determined in Step S45 that the report is not to be transmitted, the processing in FIG. 11 ends.

In Step S46, the data processing unit 201 acquires data of the report from the storage 26, for example. Then, the data processing unit 201 performs processing of the MAC layer illustrated in FIG. 4 on the acquired data to generate a MAC frame. The data processing unit 201 outputs the generated MAC frame to the wireless signal processing unit 202.

In Step S47, the wireless signal processing unit 202 performs transmission processing using EDCA.

In Step S48, the wireless signal processing unit 202 determines whether ACK from the access point 10 has been received. In Step S48, the wireless signal processing unit 202 waits for processing until ACK is received. When it is determined in Step S48 that ACK has been received, the processing in FIG. 11 ends.

Figure 12:
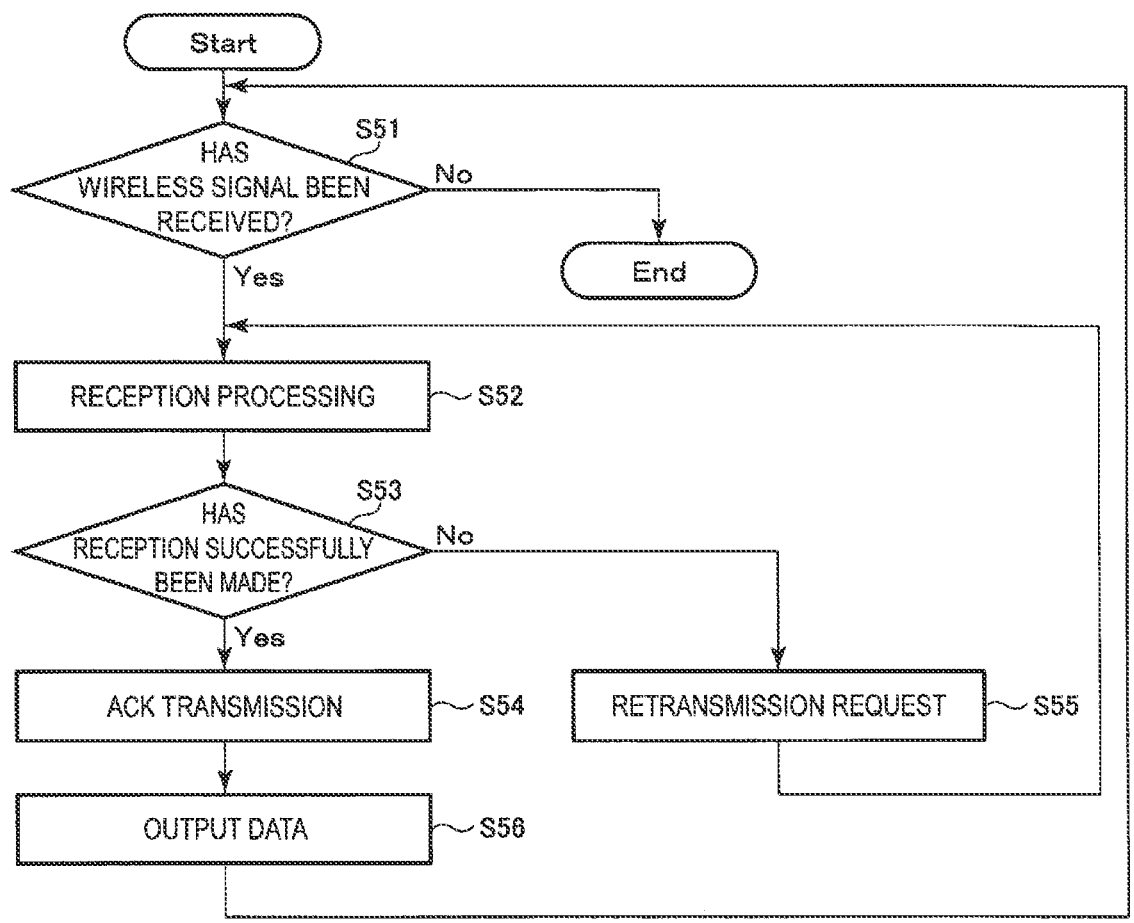
FIG. 12 is a flowchart illustrating exemplary reception processing of the access point.

FIG. 12 is a flowchart illustrating reception processing performed by the access point 10. In Step S51, the wireless signal processing unit 102 determines whether a wireless signal has been received. When it is determined in Step S51 that the wireless signal has not been received, the processing in FIG. 12 ends. When it is determined in Step S51 that the wireless signal has been received, the processing proceeds to Step S52.

In Step S52, the wireless signal processing unit 102 performs reception processing. In other words, the wireless signal processing unit 102 performs demodulation processing or the like on the wireless signal to extract an MAC frame. The wireless signal processing unit 102 outputs the MAC frame to the data processing unit 101. The data processing unit 101 performs the processing of the MAC layer on the MAC frame to restore data.

In Step S53, the data processing unit 101 determines whether reception has successfully been made. Whether the reception has successfully been made can be determined by CRC, for example. When it is determined in Step S53 that the reception has successfully been made, the processing proceeds to Step S54. When it is determined in Step S53 that the reception has not successfully been made, the processing proceeds to Step S55.

In Step S54, the data processing unit 101 causes the wireless signal processing unit 102 to transmit ACK.

In Step S55, the data processing unit 101 causes the wireless signal processing unit 102 to request retransmission of the MAC frame. Retransmission may be requested in units of MPDUs.

In Step S56, the data processing unit 101 outputs data to the upper layer such as an application layer. Thereafter, the processing is returned to Step SM.

Figure 13:
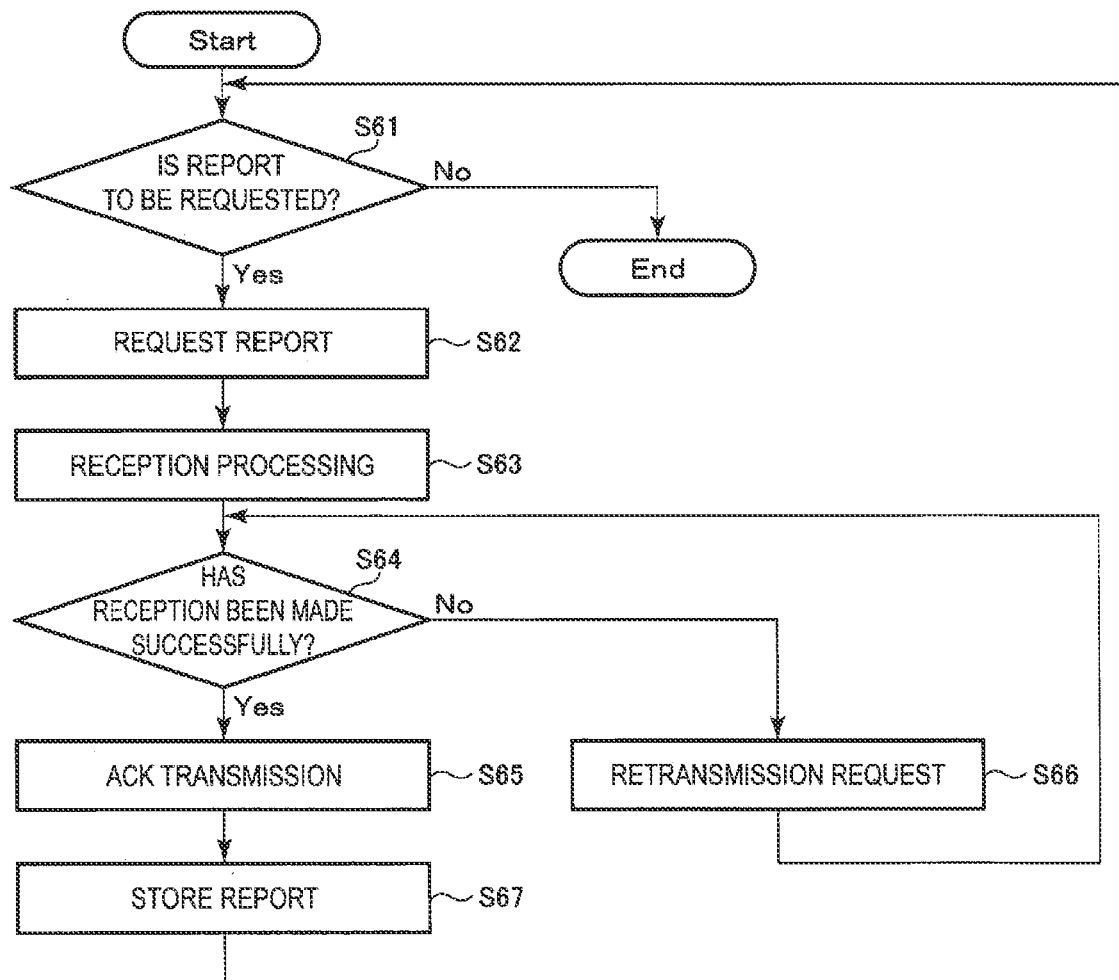
FIG. 13 is a flowchart illustrating report processing performed by the access point.

FIG. 13 is a flowchart illustrating report processing performed by the access point 10. The report processing is performed every specific period of time, such as every hour, every day, or every week. The specific period of time may be appropriately set.

In Step S61, the management unit 103 determines whether to request a report. It is determined that the report is to be requested when a specific period has elapsed or when there is a need to request a report for latency control of the RTA, for example. When it is determined in Step S61 that the report is not to be requested, the processing in FIG. 13 ends. When it is determined in Step S61 that the report is to be requested, the processing proceeds to Step S62.

In Step S62, the management unit 103 causes the wireless signal processing unit 102 to request a report.

In Step S63, the wireless signal processing unit 102 performs reception processing. In other words, the wireless signal processing unit 102 performs demodulation processing or the like on the wireless signal to extract an MAC frame. The wireless signal processing unit 102 outputs the MAC frame to the data processing unit 101. The data processing unit 101 performs processing of the MAC layer on the MAC frame to restore data of the report.

In Step S64, the data processing unit 101 determines whether reception has successfully been made. When it is determined in Step S64 that the reception has successfully been made, the processing proceeds to Step S65. When it is determined in Step S64 that the reception has not successfully been made, the processing proceeds to Step S66.

In Step S65, the data processing unit 101 causes the wireless signal processing unit 102 to transmit ACK. The data processing unit 101 outputs the data of the report to the management unit 103.

In Step S66, the data processing unit 101 causes the wireless signal processing unit 102 to request retransmission of the MAC frame. Retransmission may be requested in units of MPDUs.

In Step S67, the management unit 103 stores the report. Thereafter, the processing is returned to Step S61. The result of the measurement may be stored in the ROM 12, for example.

As described above, according to the embodiment, the terminal measures at least one of a latency and a jitter when a wireless signal is transmitted. Then, the terminal transmits a report including data of a result of measurement to the access point. Thus the access point can recognize a state of a wireless section with the corresponding terminal from the result of the measurement recorded in the report. In this manner, the access point can predict whether the requirement for a latency or a jitter is satisfied before an RTA traffic is actually input and can take a measure as needed. In a case in which the requirement cannot be satisfied, for example, the access point can determine that the RTA traffic is not handled and refuse a request for exchanging the RTA traffic when a request is received. Alternatively, the access point can also adjust the access parameter or the like to satisfy the requirement. In addition, when determining these, the access point can also evaluate reports of a plurality of terminals (such as calculation of the average and dispersion). As described above, according to the embodiment, it is possible to provide, to the access point, information that contributes to securing of the requirements even with an absolute requirements for latency and a jitter.

MODIFICATION EXAMPLES

Hereinafter, modification examples of the embodiment will be described. The report may include information related to an interference status in the terminal in addition to the result of measuring the latency or the jitter for each access category of the terminal. A transmission opportunity (TXOP) may not be able to be obtained due to influences of other interference sources and the latency may increase depending on the location of the terminal even in the same service area of the access point. In a case in which there is such a terminal, deviation of latency properties occurs. The access point can distinguish a terminal with large interference from a terminal with small interference because information related to such interference as a report is transmitted to the access point, and it is thus possible to expect improvement in accuracy of the latency properties inside the service area.

Figure 14:
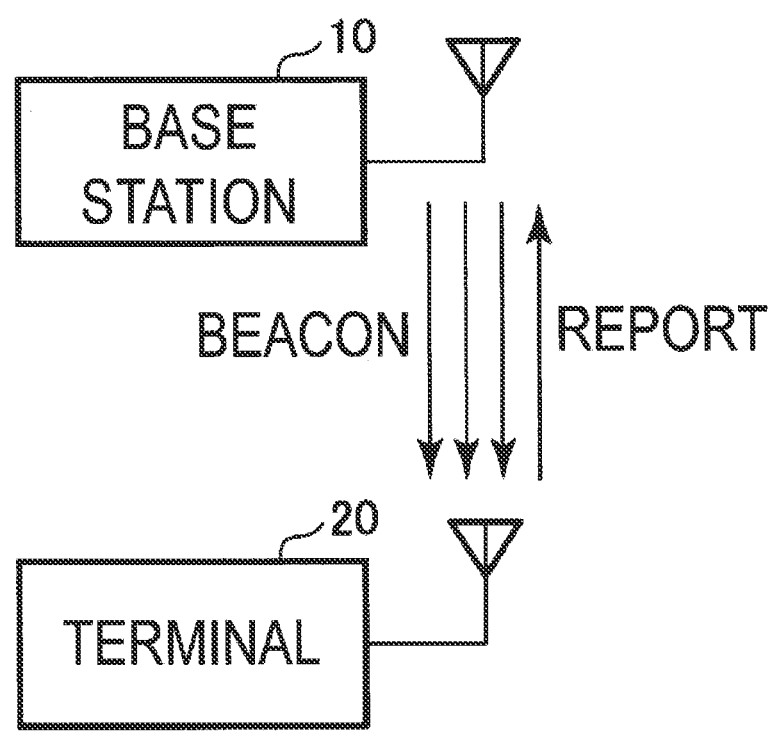
FIG. 14 is a diagram illustrating a modification example.

The access point 10 periodically transmits a beacon as illustrated in FIG. 14 during communication between the access point and the terminal. The terminal 20 calculates a success rate of reception of a beacon from the access point 10 as information for evaluating the interference of the terminal 20. In addition, the terminal 20 calculates a difference, as information for evaluating the interference of the terminal 20, between a clock time (time stamp) at which the access point 10 stores the beacon at the time of creation of the beacon and a clock time when the beacon is received. The terminal 20 transmits, to the access point 10, information for evaluating such interference included in the report. Note that the information for evaluating the interference of the terminal 20 is not limited to specific information.

Also, at least one of the latency and the jitter is measured by the terminal, and the result of the measurement is reported from the terminal to the access point in the aforementioned embodiment and the modification examples thereof. On the contrary, at least one of the latency and the jitter may be measured by the access point, and the result of the measurement may be reported from the access point to the terminal. In this case, the processing in FIGS. 10 and 11 is performed by the access point, and the processing in FIGS. 12 and 13 is performed by the terminal. In the case of the access point, the measurement result may be included in a beacon and transmitted to the terminal.

Also, the processing in the aforementioned embodiment can also be stored as a program that a processor, which is a computer, can be caused to execute. In addition, the processing can be stored and distributed in a storage medium of an external storage device such as a magnetic disk, an optical disc, or a semiconductor memory. Then, the processor can execute the aforementioned processing by reading the program stored in the storage medium of the external storage device and by the read program controlling operations.

REFERENCE SIGNS LIST

1 Communication system
10 Access point
11 Processor
12 ROM
13 RAM
14 Wireless module
15 Router module
20 Terminal
21 Processor
22 ROM
23 RAM
24 Wireless module
25 Display
26 Storage
101 Data processing unit
102 Wireless signal processing unit
103 Management unit
201 Data processing unit
202 Wireless signal processing unit
203 Measurement unit

The invention claimed is:
1. A terminal apparatus comprising:
a processor configured to:
  measure a latency when a wireless signal is transmitted to an access point and a jitter of the wireless signal; and
  generate information including a result of the measurement; and
a wireless signal processing circuit configured to transmit the information to the access point, wherein the processor measures the latency and the jitter for each item of traffic identification information added to data included in the wireless signal.

2. The terminal apparatus according to claim 1, wherein the information includes information regarding an attribute of the terminal apparatus.

3. The terminal apparatus according to claim 1, wherein the processor measures the latency from a period of time from when the wireless signal processing circuit transmits the wireless signal to when an acknowledge from the access point is received.

4. The terminal apparatus according to claim 1, wherein the processor measures the latency from a period of time from when a MAC frame including data of the wireless signal is input to an end of a transmission queue of the wireless signal processing circuit to when the MAC frame arrives at a head of the transmission queue.

5. The terminal apparatus according to claim 1, wherein the processor measures the latency from a period of time from when a MAC frame including data of the wireless signal reaches a head of a transmission queue of the wireless signal processing circuit to when the wireless signal processing circuit transmits the wireless signal.

6. The terminal apparatus according to claim 1, wherein the processor measures the latency from a period of time from when a retransmission request of the wireless signal is received from the access point to when the wireless signal processing circuit retransmits the wireless signal.

7. The terminal apparatus according to claim 1, wherein the processor further measures interference when the wireless signal is transmitted, and
generates information including a result of the measurement of the interference.

8. A terminal apparatus comprising:
a processor configured to:
measure a latency when a wireless signal is transmitted to an access point and a jitter of the wireless signal; and
generate information including a result of the measurement; and
a wireless signal processing circuit configured to transmit the information to the access point,
wherein the wireless signal processing circuit controls transmission of the wireless signal in accordance with an access category of the wireless signal classified in accordance with data included in the wireless signal, and
the processor measures the latency and the jitter for each access category.

9. A communication method comprising:
by a terminal apparatus, measuring a latency when a wireless signal is transmitted to an access point and a jitter of the wireless signal, wherein the latency and the jitter for each item of traffic identification information added to data included in the wireless signal are measured;
by the terminal apparatus, generating information including a result of the measurement; and
by the terminal apparatus, transmitting the information to the access point.

10. A non-transitory storage medium storing a communication program for causing a processor of a terminal apparatus to perform:
measuring a latency when a wireless signal is transmitted to an access point and a jitter of the wireless signal, wherein the latency and the jitter for each item of traffic identification information added to data included in the wireless signal are measured;
generating information including a result of the measurement; and
transmitting the information to the access point.

11. A communication method comprising:
measuring a latency when a wireless signal is transmitted to an access point and a jitter of the wireless signal;
generating information including a result of the measurement; and
transmitting the information to the access point,
wherein the wireless signal is transmitted in accordance with an access category of the wireless signal classified in accordance with data included in the wireless signal, and the latency and the jitter are measured for each access category.

12. A non-transitory storage medium storing a communication program for causing a processor of a terminal apparatus to perform the communication method of claim 11.

* * * * *